United States Patent [19]

Rolando et al.

[11] Patent Number: 5,532,058
[45] Date of Patent: Jul. 2, 1996

[54] DRY-BONDED FILM LAMINATE EMPLOYING POLYURETHANE DISPERSION ADHESIVES WITH IMPROVED CROSSLINKERS

[75] Inventors: Thomas E. Rolando, Maple Grove; Peter A. Voss, Plymouth; Christopher M. Ryan, Dayton, all of Minn.

[73] Assignee: H. B. Fuller Licensing & Financing, Inc., Arden Hills, Minn.

[21] Appl. No.: 105,441

[22] Filed: Aug. 12, 1993

Related U.S. Application Data

[63] Continuation-in-part of Ser. No. 43,565, Apr. 7, 1993, Pat. No. 5,494,960, and Ser. No. 973,221, Nov. 6, 1992, abandoned, which is a continuation of Ser. No. 624,618, Dec. 10, 1990, abandoned.

[51] Int. Cl.$^6$ .......................... B32B 15/08; B32B 27/32; B32B 27/36; B32B 27/40
[52] U.S. Cl. ............... 428/341; 428/423.1; 428/423.5; 428/423.7; 428/424.2; 428/424.8; 428/425.8; 428/458
[58] Field of Search ............... 428/423.1, 341, 428/423.7, 423.9, 424.2, 423.5, 424.8, 425.8, 458

[56] References Cited

U.S. PATENT DOCUMENTS

| | | | |
|---|---|---|---|
| 3,905,929 | 9/1975 | Noll | 260/29.2 TN |
| 4,147,679 | 4/1979 | Scriven et al. | 260/29.2 TN |
| 4,301,053 | 11/1981 | Wolfrey | 260/29.2 TN |
| 4,433,095 | 2/1984 | Hombach et al. | 524/563 |
| 4,460,738 | 7/1984 | Frentzel et al. | 524/591 |
| 4,524,104 | 6/1985 | Hagio et al. | 428/341 |
| 4,528,334 | 7/1985 | Knopf et al. | 525/404 |
| 4,540,633 | 9/1985 | Kucera et al. | 428/423.1 |
| 4,612,054 | 9/1986 | Hamon | 106/264 |
| 4,616,061 | 10/1986 | Henning et al. | 524/591 |
| 4,623,416 | 11/1986 | Henning et al. | 156/331.7 |
| 4,801,644 | 1/1989 | Coogan . | |
| 4,851,459 | 7/1989 | Ramalingam . | |
| 4,876,308 | 10/1989 | Melby | 528/65 |
| 4,883,694 | 11/1989 | Ramalingam | 428/35.2 |
| 4,923,756 | 5/1990 | Chung et al. | 428/480 |
| 4,963,637 | 10/1990 | Barksby | 528/59 |

FOREIGN PATENT DOCUMENTS

| | | |
|---|---|---|
| 0237997 | 9/1987 | European Pat. Off. . |
| 369389 | 9/1990 | European Pat. Off. . |
| 0315832 | 5/1991 | European Pat. Off. . |
| 63-15816 | 1/1988 | Japan . |
| 64-114 | 1/1989 | Japan . |
| 9115529 | 10/1991 | WIPO . |

OTHER PUBLICATIONS

Product Data Sheet: UCARLNK® Crosslinker XL–29SE, Jul. 29, 1993.
Material Data Safety Sheet–Crosslinker CX–100, ICI Resins, (Jun. 1991), 3 pages.
Product Information Sheet–Polyfunctional Aziridines–XAMA®–2, XAMA®–7, Eit, Inc., (undated), 7 pages.
Product Information Sheet–Crosslinker CX–100 Crosslinker for Air and/or Low Bake Coatings, ICI Resins, (Oct. 1989), 6 pages.
Product Information Sheet–Neotac® Adhesive Polymers––Bulletin AS–5, ICI Resins, (Aug. 1991), 35 pages.
"A Complete Guide To DMPA® Brand Dimethylolpropionic Acid," Pitman–Moore (undated), pp. 29–31 (abstracts 30 & 35).
"Aqueous Polyurethane Dispersions from TMXDI® (META) Aliphatic Isocyanate," American Cyanamid Co., Feb. 1989.
"Two New Isocyanates For The Polyurethane Industry", Journal of Cellular Plastics, Nov./Dec. 1982 Arendt et al.

*Primary Examiner*—Dhirajlal Nakarani
*Attorney, Agent, or Firm*—Vidas, Arrett & Steinkraus

[57] ABSTRACT

Improved bonded properties of dry-laminated flexible film substrates, for instance laminates comprising films of thermoplastics such as polyolefins, polyesters, and polyamides, as well as paper, cellophane, and metals, particularly after exposure to boiling water, are obtained with polyurethane dispersion adhesives when a plural aziridine or carbodiimide compound, or a mixture of a plural epoxy compound with a plural aziridine or carbodiimide compound, is employed as the crosslinker for the adhesive system.

21 Claims, No Drawings

DRY-BONDED FILM LAMINATE EMPLOYING POLYURETHANE DISPERSION ADHESIVES WITH IMPROVED CROSSLINKERS

CROSS REFERENCE

This application is a continuation-in-part of application Ser. No. 07/973,221 filed Nov. 6, 1992, now abandoned, incorporated herein by reference, which is a continuation of Ser. No. 07/624,618, filed Dec. 10, 1990, now abandoned. This application is also a continuation-in-part of application Ser. No. 08/043,565, filed Apr. 7, 1993, now U.S. Pat. No. 5,494,960.

BACKGROUND OF THE INVENTION

The invention pertains to formulations employing aqueous dispersions of polyurethanes to which are added crosslinking agents at the time of use. One particularly important application of such dispersions is as adhesives in the manufacture of laminates from thin flexible sheet substrates. The aqueous dispersion is mixed with the crosslinking agent and then applied to a first sheet as a thin film. The aqueous vehicle is periled to evaporate from the adhesive film and the adhesive is then contacted with a second sheet, typically with the application of heat and/or pressure, to join the sheets into a laminate.

Large amounts of such laminates are used in the packaging industry, especially in making food packaging, and it is therefore desirable for environmental, health and safety reasons that the adhesives employed in forming the laminate and in bonding packaging prepared therefrom be solvent free. It is also important that the adhesive bonds be capable of withstanding high temperatures and humidities, for instance boiling water exposure.

Kucera et al., U.S. Pat. No. 4,540,633, discloses polyurethane dispersion adhesive compositions formed by mixing a polyurethane dispersion and an epoxy or polyisocyanate.

Ramalingam, U.S. Pat. No. 4,883,694, discloses water dispersed polyurethane adhesives for flexible film laminates in which peroxide extended polyurethane dispersions are crosslinked using an epoxy functional compound.

Scriven et al., U.S. Pat. No. 4,147,679, discloses thermosettable polyurethane dispersion coating formulations, mentioning as curing agents aminoplast resins, formaldehyde, phenolic resins, alkoxysilanes, organic polyisoeyanates (blocked or free) and epoxies.

Holmbach et al., U.S. Pat. Nos. 4,433,095 and 4,663,377, respectively disclose aromatic and aliphatic polyisocyanate dispersable compositions useful as crosslinking agents for polyurethane dispersion adhesives.

Wolfrey, U.S. Pat. No. 4,301,053, describes aqueous polyurethane coating dispersion formulations employing aziridine compound crosslinkers. The coatings, however, are described as hard and in order to obtain adherence to non-polar thermoplastic substrates it is said to be necessary to add N-methylpyrrolidone solvent to the formulation.

SUMMARY OF THE INVENTION

The invention pertains to an aqueous polyurethane dispersion and its use in adhesives for manufacturing laminate structures. In particular, it has been discovered that improved bonded properties of dry-laminated flexible film substrates, for instance laminates comprising films of thermoplastics such as polyolefins, polyesters, and polyamides, as well as paper, cellophane, and metals, particularly after exposure to boiling water, are obtained with polyurethane dispersion adhesives when a plural aziridine or carbodiimide compound, or a mixture of a plural epoxy compound with a plural aziridine or carbodiimide compound, is employed as the crosslinker for the adhesive system.

The invention, in one aspect, is a dry-bonded film laminate comprising a pair of flexible film substrates bonded with an adhesive, the adhesive comprising a polyurethane polymer having carboxylic or sulfonic acid groups thereon crosslinked with a crosslinker comprising a plural aziridine or plural carbodiimide compound.

A further aspect of the invention is a curable adhesive, prepared by blending two parts at the time of use, the first part comprising a polyurethane polymer dispersed in an aqueous vehicle, the polymer having a plurality of carboxylic or sulfonic acid groups which may be optionally neutralized with a tertiary amine, and the second part comprising a plural aziridine or a plural carbodiimide compound.

A still further aspect of the invention comprises a method of manufacturing a flexible film laminate comprising: applying to a first flexible film substrate an aqueous adhesive comprising a dispersion in water of a polyurethane polymer having plural carboxylic acid or sulfonic acid groups thereon which may be optionally neutralized with a tertiary amine, and a crosslinking agent; drying the adhesive; and then applying a second flexible film substrate to the dried adhesive, the improvement comprising that the crosslinking agent comprises an aziridine or carbodiimide compound.

DETAILED DESCRIPTION OF THE PREFERRED EMBODIMENT

The polyurethane dispersions used in the invention have carboxylic acid or sulfonic acid groups on the polyurethane polymer molecule, optionally, and preferably, neutralized with a tertiary amine. Such dispersions may be prepared by well known procedures which involve the steps of:

(i) reacting a mixture of (a) an aliphatic polyfunctional isocyanate compound, and (b) an acid functional polyol component to form a polyurethane prepolymer; and then (ii) dispersing the resulting polyurethane prepolymer in water in the presence of a dispersion stabilizing amount of a tertiary amine. Preferred dispersions are prepared by adding the tertiary amine to the prepolymer forming reaction mixture of isocyanate compound and the polyol component prior to said prepolymer forming reaction.

Suitably the prepolymer is left with a residual level (typically 2.0–3.0%) of isocyanate groups which can be reacted with chain extenders and chain terminators after dispersion so as to increase the molecular weight of the dispersed polymer and provide pendant reactive crosslinkable groups. The final polyurethane polymer is substantially free (<0.5%) of isocyanate groups.

Especially preferred are polyurethane dispersions prepared from aliphatic polyisocyanates which are characterized by median particle sizes of 80 nm or less, typically 30–80 nm, preferably 70 nm or less. Median particle sizes are determined conventionally, for instance by use of a BI-90 particle sizer sold by Brookhaven Instruments. The small particle size dispersions of the invention are almost clear and have much improved application properties, especially on rotogravure application machinery.

In the preferred embodiments the aliphatic isocyanate is a hindered isocyanate compound. The use of a hindered isocyanate helps prevent isocyanurate trimer formation during polymer manufacture and reduces reactivity of residual isocyanate groups on the prepolymer to water. The hindered isocyanate compound can be any di-, tri- or polyfunctional isocyanate having tertiary aliphatic isocyanate functionality. Representative, non-limiting examples of such isocyanates include m-tetramethylxylene diisocyanate and p-tetramethylxylene diisocyanate. Other polyisocyanates containing at least one sterically hindered group, such as isophorone diisocyanate are also usefully employed in the preferred embodiments.

The plural isocyanate compound is reacted with a polyol component providing acid functionality that will permit formation of stable dispersions in aqueous amine solution. The acid functional polyol component may comprise a polyol having at least two isocyanate reactive hydrogens and at least one acid functional group or a combination of a polyol free of acid functionality having at least two isocyanate reactive hydrogens together with another compound having acid functionality and hydroxy, amine or thiol functionality.

Preferably, the polyhydroxy polymer compound or polyol used to make the prepolymer of the invention has a molecular weight of 500 to 3,000, more preferably 1,000 to 2,000. Such polymers can be polyester condensation products of commercially available of dicarboxylic acids and hydroxy compounds such as diols, triols, tetraols, etc. Additionally, such polymers can be polyether diols, triols, etc., based on polymers of ethylene oxide or propylene oxide.

The polyhydroxyl materials or polyols can be either low or high molecular weight materials and in general will have average hydroxyl values as determined by ASTM E-222-67, Method B, between about 1000 and 10, and preferably between about 500 and 50. The term "polyol" is meant to include materials having an average of two or more hydroxyl groups per molecule.

The polyols include low molecular weight diols, triols and higher alcohols, low molecular weight amide-containing polyols and higher polymeric polyols such as polyester polyols, polyether polyols and hydroxy-containing acrylic interpolymers.

The polyol component of the prepolymer reaction mixture may comprise an acid grafted polyether polyol such as the polypropylene oxides grafted with, for example, maleic or fumaric acid, as taught in Frentzel et al., U.S. Pat. No. 4,460,738 or Knopf et al., U.S. Pat. No. 4,528,334. Other polyester polyols produced from mixtures of di and tri or higher functional acid and polyol components in ratios which provide residual acid functionality as well as plural hydroxy groups may also be employed.

Alternatively, the polyol component comprises a mixture of a polyol free of acid functionality and an acid functional compound having hydroxy, amine or thiol functionality. Suitable such acid functional compounds include hydroxy and mercapto carboxylic acids, amino carboxylic acids, aminohydroxy carboxylic acids, hydroxysulfonic acids, amino sulfonic acids, and aminohydroxy sulfonic acids. Representative, non-limiting examples of such acids include dimethylolpropionic acid, glycolic acid, thioglycolic acid, lactic acid, malic acid, dihydroxymalic acid, tartaric acid, dihydroxytartaric acid, 2,6-dihydroxybenzoic acid, oxaluric acid, anilidoacetic acid, glycine, α-alanine, 6-aminocaproic acid, the reaction product of ethanolamine and acrylic acid, hydroxyethylpropionic acid, 2-hydroxyethanesulfonic acid and sulphanilic acid.

Desirably the polyurethane prepolymer has sufficient acid groups to provide an acid number of between about 10 and 30, preferably 14–16. The acid number is defined as the number of milligrams potassium hydroxide required to neutralize all the acid groups of the material. It is determined by titration per ASTM D-1639.

Where flexible and elastomeric properties are desired, the polyurethane prepolymer should preferably contain at least a portion of a higher molecular weight polymeric polyol. Such a polymeric polyol should be predominantly linear (that is, absence of trifunctional or higher functionality ingredients) to avoid any chance of gelling of the resultant polymeric product and should have a hydroxyl value of 200 or less, preferably within the range of about 150 to 30.

The most suitable polymeric polyols include polyalkylene ether polyols including thioethers, polyester polyols including polyhydroxy polyesteramides and hydroxyl containing polycaprolactones and hydroxy-containing acrylic interpolymers.

Any suitable polyalkylene ether polyol may be used. Included are poly(oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols, for example, glycols such as ethylene glycol, 1,6-hexanediol, Bisphenol A, and the like, or higher polyols, such as trimethylol propane, pentaerythritol and the like. Polyols of higher functionality which can be utilized as indicated can be made, for instance, by oxyalkylation of compounds as sorbitol or sucrose. One commonly utilized oxyalkylation method is by reacting a polyol with an alkylene oxide, for example, ethylene or propylene oxide in the presence of an acidic or basic catalyst.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols. Suitable polyester polyols are sold by Ruco Corp. under the Rucoflex® trademark, including Rucoflex 1011, 1019, 108, 1015, 1035, 1040, 101, 102, 1037 and 1095.

The diols which are usually employed in making the polyester include alkylene glycols, such as ethylene glycol and butylene glycol, neopentyl glycol and other glycols such as hydrogenated Bisphenol A, cyclohexane diol, cyclohexane dimethanol, caprolactone diol (for example, the reaction product of caprolactone and ethylene glycol), hydroxyalkylated bisphenols, polyether glycols, for example, poly(oxytetramethylene) glycol and the like. However, other diols of various types and, as indicate polyols of higher functionality can also be utilized. Such higher polyols can include, for example, trimethylolpropane, trimethylolethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

In a preferred embodiment, the polyfunctional polyol compound is reacted with the hindered aliphatic polyfunctional isocyanate in the presence of a strong catalyst at a temperature from about 40° to 140° C., more preferably from about 50° to 120° C., and most preferably, from about 60° to 100° C. A representative non-limiting list of catalysts which may be used to drive this reaction includes t-amines and organometallics such as dibutyltindilaurate, tin oleate, lead naphthanate, etc. Tin catalysts are preferred. The hindered isocyanate can be reacted with the polyol at an isocyanate/OH ratio of about greater than 1.1 moles of isocyanate per mole of OH, preferably 1.2 moles to 2.0 moles isocyanate per mole of OH and most preferably about 1.4 to 1.7 moles isocyanate per mole of OH. When a small molecule polyol with pendant acid functionality is used with an acid free polyol, the acid compound can be added at a rate of about 5 to 15 wt. % of the polyol.

The polyurethane polymer is suitably stabilized in dispersion by neutralization of the acid functional groups on the polymer with a tertiary amine compound. Suitably the tertiary amine compound has three aliphatic substituents. Such substituents can be $C_{1-15}$ alkyl groups which may optionally be cyclic aliphatic groups. The tertiary amine may also be a cyclic aliphatic amine compound. Specific examples of such tertiary amines include trimethylamine, triethylamine, tri-n-propyl amine, tri-n-butyl amine, N-methylpiperidine, N-ethylpiperidine, N-methylpyrrolidine, ethyldipropyl amine, etc. Neutralization by formation of alkali metal salts of the acid functional groups is also known.

In the preferred dispersions, when the acid number of the prepolymer is 10–14, the amount of tertiary amine used in the prepolymer forming reaction should be at least sufficient to completely neutralize all of the acid groups on the prepolymer. When the acid number of the prepolymer is greater than 14, the amount of tertiary amine used in the prepolymer forming reaction should be at least sufficient to completely neutralize an equal amount of material having an acid number of 14. This is an amount substantially greater than would be used to simply catalyze a reaction of isocyanate and polyol groups.

It is also possible to utilize a polyurethane prepolymer which is stabilized in dispersion by the presence of nonionic poly(ethylene oxide) or poly(ethylene oxide/propylene oxide) groups on the polymer so that the acid groups on the polymer need not be neutralized in order to disperse the prepolymer in the aqueous vehicle.

In the formation of the preferred adhesive polymer dispersion for use in the invention, a preferred polymer can be manufactured by reacting the hindered di- or tri isocyanate compound, an acid functional polyol, additional optional amounts of polyol free of acid functionality and amounts of chain extending agents and chain terminating agents that cooperate to control molecular weight. Generally it is desirable to utilize chain extending and terminating agents after dispersion of the prepolymer in water. Chain extenders are suitably compounds having two or more amine groups more reactive to isocyanate than water. Chain terminators are suitably compounds having a single isocyanate reactive amine group.

The chain extending agent is added in a proportion that leaves less than 0.5 wt. %, generally less than 0.1 wt. %, preferably 0%, of free reactive isocyanate. The chain termination agent is used at an amount that controls molecular weight to about 1,500 to 10,000 and results in little free isocyanate (i.e., less than 0.5 wt. %). Small molecule chain extending agents and small molecule chain terminating agents, when used, are preferably added at a rate of less than about 5 wt. % of the dispersed polyurethane prepolymer. If high molecular weight agents are used amounts should be adjusted accordingly.

The di- tri-, etc., amines which can be employed as chain extenders in the preparation of the urethanes of the invention can be primary or secondary diamines or polyamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other non-reactive groups can be present attached to the carbon atom, such as oxo, sulfo, halo or nitroso. Aminoalcohols, and aminophenols can be employed as chain terminators which leave a residual hydroxyl groups available for subsequent crosslinking reactions. Representative, non-limiting examples include monoethanolamine, and p-aminophenol.

The final dispersed polyurethane polymer used in the adhesives of the invention is substantially free of reactive isocyanate groups, is typically hydroxy or amine terminated, and usually has a substantial proportion of neutralized acid functional pendant groups which, in combination with the neutralizing tertiary amine compound, cooperate to stabilize the polymer in the aqueous dispersion.

The aqueous vehicle in which the polyurethane polymer is dispersed may optionally have added to it dispersing agents, thixotropes or hardeners among other potential constituents which may be wholly or partially dissolved in the aqueous phase. Volatile organic solvents are preferably avoided, however, since a solvent-free liquid vehicle is useful in minimizing environmental and safety hazards often prevalent with the use of volatile organic solvents.

Optionally, the dispersed phase may also comprise fillers or other functional material depending on the intended application.

The polyurethane polymer dispersion preferably has a solids content of about 10 to 80 wt. %, preferably about 20 to 60 wt. %, and most preferably from about 30 to 40 wt. %. Further, this polymer dispersion has a low viscosity of from about 25 to 2,000 cps, preferably from about 50 to 1,000 cps, and most preferably from about 100 to 300 cps.

The polyurethane dispersion of the present invention will remain storage stable and fully dispersed within the liquid vehicle for extended periods of time. During storage the level of particle separation or the degree of particle dispersion present does not change to a degree that the dispersion is broken or particle clumping can interfere with the formation of an effective bond. Adhesive Formulations The dispersions are used in the invention with a crosslinking agent to produce an adhesive which is particularly suited for use as laminating adhesives for hot-fill, boil-in-bag and retortable packaging materials. Such adhesives of the invention comprise a mixture of the polyurethane dispersion with a crosslinking agent which comprises a compound having plural aziridine or carbodiimide groups, optionally in admixture with a compound having plural epoxy groups. Examples of suitable plural aziridine compounds are include trimethylolpropane-tris-(-β-(N-aziridinyl)propionate, pentaerythritol-tris-β-(N-aziridinyl)propionate and 1-aziridinepropanoic acid, 2-methyl-, 2-ethyl-2[[3-(2-methyl-1-aziridinyl)-1-oxopropoxy]methyl]-1,3-propanediyl ester. A suitable plural carbodiimide crosslinker composition is UCARLINK® Crosslinker XL-29SE sold by Union Carbide, a 50% solids solution of a 2,000 MW multifunctional carbodiimide compound in propylene glycol monomethyl ether acetate.

Epoxy compounds can be any small molecular or polymeric compound or mixtures thereof having more than 1 epoxy group per molecule. Useful polyepoxies include the glycidyl ethers of polyphenols such as bisphenol A or a polyol such as butanediol.

The crosslinking agent is added to the polyurethane dispersion of the invention shortly prior to the application of the mixture to a substrate. Suitably the aziridine compound crosslinker is employed at a level of about 1% to 20% by weight, based on adhesive polymer solids, preferably 1% to 5%. Epoxy compounds, when employed as co-crosslinking agents, may be employed at a level of about 0.1% to 10% by weight, based on adhesive polymer solids, preferably 0.5% to 5%. Carbodiimide compound crosslinkers are suitably employed at a level of about 0.5% to 20% by weight, solids basis, based on adhesive polymer solids, preferably 1% to 5%.

The crosslinking agent may be added to the prepolymer dispersion neat, or as a solution or dispersion. After the addition of the crosslinking agent to the aqueous polymer dispersion, but before curing, the blended adhesive maintains a relatively low viscosity. Preferably, the viscosity of the blended adhesive is less than about 1,000 cps, and more preferably it is between about 100 and 500 cps. The blended adhesive preferably contains between 20 and 60 wt. % solids, and more preferably between 30 and 40 wt. % solids.

Application of the Adhesive

Application may be performed by spraying, roll coating, the use of doctor blades, brushing or dipping. For flexible film substrates roll coating, suitably by rotogravure, is recommended. The adhesive can be applied to a wide variety of substrates (including non-polar thermoplastics), for instance, polyolefins (e.g. polyethylene and polypropylene in various forms such as low density polyethylene, oriented polypropylene and linear low density polypropylene), polyesters such as polyethylene terephthalate (PET), metal films, nylon, paper, cellophane, metallized polyester, etc., and is especially suitable for preparation of flexible retortable packaging laminate materials.

For typical flexible film laminate materials, application at a rate of 0.5–4.0 lbs, preferably 1.0–2.0 lbs, adhesive solids per 3000 ft$^2$, will generally provide satisfactory results.

After the adhesive dispersion has been applied to the first substrate, it is dried to form an adhesive film on the surface of the substrate. Any method known to those skilled in the art may be used to dry the adhesive, including conventional ovens, circulating ovens, infrared radiation, heat lamps, as well as flash drying the adhesive on the substrate surface.

After the adhesive is dried, the mating second substrate is contacted with the adhesive film. This substrate may be of the same or different material as the first substrate, typically with the application of heat and/or pressure. The use of different substrate materials allows one to prepare a laminate combining properties of the two materials. Thus, it may be desirable to laminate one film having excellent moisture vapor barrier properties to another film having excellent strength characteristics. The choice of substrates would therefore be up to the skilled practitioner in this art to achieve a laminate of the particular desired properties for that user.

The use of heat and pressure to apply the second substrate facilitates bonding and crosslinking. Typically a film coating and laminating apparatus will run at a rate of 100–600 linear feet of film per min., will use a drying oven 10–25 feet long at 120°–300° F., and will apply the second film substrate to the dried adhesive at a nip pressure of 20–60 psi and a temperature of 110°–220° F. Other application, drying and curing temperatures, however, can be readily employed by those skilled in the art.

The present invention may be further understood by reference to the following specific examples which are illustrative of the method of forming the adhesive laminate of the present invention.

EXAMPLE 1

Into a three neck flask provided with a thermometer, inert gas source and mechanical stirrer was placed 16.3 grams of poly(propylene oxide) diol (Voranol 220-110, Dow Chemical), 3.9 grams of an adipic acid/hexanediol/isophthalic acid polyester diol (Rucoflex 1019-35, Ruco), 1.2 grams of dimethylolpropionic acid, 8.1 grams of tetramethylxylene diisocyanate (TMXDI), 0.9 grams of triethylamine (equivalent to 100% neutralization of acid groups) and 0.01 grams of dibutyltindilaurate. The contents were heated to 200° F. for approximately 3.5 hours until a NCO content of 2.0% was achieved. The resulting polyurethane prepolymer was then added to 68.0 grams of water with vigorous stirring. After all of the prepolymer was added a mixture of 2.0 grams of water, 0.3 grams of ethylenediamine and 0.15 grams of ethanolamine were added to the dispersion. The resulting dispersion contained about 30% solids and had a pH of about 8.0. Other properties of the dispersion were as follows:

Prepolymer acid number=16.5

Appearance (dispersion)—almost clear.

Median particle size—70 nm, mostly monomodal, narrow particle size distribution.

Appearance (film)—clear

Machineabilty—excellent, open set time test indicates greater than 5 minutes

Shelf life stability—greater than 3 months.

A two part adhesive formulation was prepared, the first part being the polyurethane dispersion described above and the second part being the plural azridine compound 1-aziridinepropanoic acid, 2-methyl-, 2-ethyl-2[[3-(2-methyl-1-aziridinyl)- 1-oxopropoxy]methyl]-1,3-propanediyl ester. The weight blend ratio of first part to second part, solids basis, was 94:4 (98:2 solution basis).

EXAMPLE 2

Into a three neck flask equipped with a thermometer, inert gas source, and mechanical stirrer was placed 13.3 grams of a polyether triol (Voranol 230-112, Dow Chemical) and 1.3 grams of phthalic anhydride. The contents were heated to 310°–320° F. and held for approximately 1 hour until an acid number of 34±1 was achieved. The resulting acid functional polyester polyol was cooled to 150° F. and 14.0 grams of an adipic/isophthalic/hexanediol polyester (Rucoflex 1019-55), 5.7 grams of IPDI (Huls) and 0.9 grams of triethylamine were then added and the mixture heated to 170° F. and held for approximately 1 hour until a NCO content of 2.4% was achieved. The prepolymer was then added to 62.1 grams of water with vigorous agitation. After all of the polymer was added, a mixture of 2.0 grams of water, 0.4 grams of ethylene diamine and 0.3 grams of ethanolamine was added to the dispersion. The resulting dispersion contained 35% solids and had a pH of 7.5. The median particle size was 70 nm. The acid number of the prepolymer was 13.5.

A two part adhesive formulation was prepared, the first part being the polyurethane dispersion described above and the second part being the plural azridine compound 1-aziridinepropanoicacid, 2-methyl-, 2-ethyl-2[[3-(2-methyl-1-aziridinyl)- 1-oxopropoxy]methyl]1,3-propanediyl ester. The weight blend ratio of first part to second part, solids basis, was 94:6.

EXAMPLE 3

A three part adhesive formulation was prepared, the first part being the polyurethane dispersion described in Example 1, the second part being the plural aziridine compound 1-aziridinepropanoicacid, 2-methyl-, 2-ethyl-2[[3-(2-methyl- 1-aziridinyl)-1-oxopropoxy]methyl]-1,3-propanediyl ester, and the third part being the plural epoxy compound Epon® 828, as a 70% dispersion in water using a non-ionic dispersing agent. The weight blend ratio of first part to second and third parts, solids basis, was 89:5:6.

EXAMPLE 4

A two part adhesive formulation was prepared, the first part being the polyurethane dispersion described in Example 2, the second part being the plural carbodiimide composition, UCARLINK®XL-29SE. The weight blend ratio of first part to second part, solids basis, was 96:4.

EXAMPLE 5

A Formulation A of the invention was prepared by blending the polyurethane dispersion of Example 2 with 1-aziridinepropanoic acid, 2-methyl-, 2-ethyl- 2[[3-(2-methyl-1-aziridinyl)-1-oxopropoxy]methyl]-1,3-propanediyl ester at a solids basis weight ratio of 94:6.

A Formulation B of the invention was prepared by blending the polyurethane dispersion of Example 2 with 1-aziridinepropanoic acid, 2-methyl-, 2-ethyl- 2[[3-(2-methyl-1-aziridinyl)-1-oxopropoxy]methyl]-1,3-propanediyl ester and the plural epoxy compound dispersion employed in Example 3, at a solids basis weight ratio of 91:4:5.

A Formulation C of the invention was prepared by blending the polyurethane dispersion of Example 2 with the plural carbodiimide UCARLINK® XL-29SE at a solids basis weight ratio of 96:4.

A comparative Formulation D was prepared by blending the polyurethane dispersion of Example 2 with plural epoxy compound dispersion employed in Example 3, at a solids basis weight ratio of 90:10.

Laminates of polyethylene terephthalate film to aluminum metal foil and polypropylene were using a coating and laminating machine running at a rate of 300 ft./min., applying the blended adhesive to a polyethylene terephthalate film substrate by rotogravuer at a level of 1.0 lb per 300 ft$^2$, solids basis, passing the adhesive coated film through a 15 foot drying oven at a temperature of 150° F., and then applying a second film substrate of aluminium foil or polypropylene at a nip temperature of 150° F. and a pressure of 40 psi. The laminates were cured at ambient temperature for 3 days before testing. Tests were performed on 1 inch test strips. The test strips were then tested for 180° peel at a rate of 12 inches per minute. Additional test strips of the PET/foil laminate were immersed in boiling water for 1 hour then subjected to the same 180° peel testing. Heat seal resistance was determined by placing the laminate (PET to foil) in a heat sealing apparatus for 2 seconds at the desired temperature with 40 psi pressure applied to a line of the laminate. The temperature at which the laminate failed, as evidenced by delamination or bubbling along the pressure line was recorded. Test results, averages of several samples, are shown in the table.

| | Film Laminating Performance | | | |
|---|---|---|---|---|
| | PEEL STRENGTH (grams) | | RESISTANCE PROPERTIES | |
| | | | PET/Foil Peel Strength After Hot Water Soak (grams) | PET/Foil Heat Seal Resistance |
| Adhesive | PET/Foil | PET/PP | | |
| A (aziridine) | 400 | Destruct[1] | 350 | 400° F. |
| B (aziridine/epoxy) | 590 | 325 | 500 | 400° F. |
| C (carbodiimide) | 650 | Destruct | 600 | 350° F. |
| D (epoxy) | 600 | 300 | 300 | 300° F. |

[1]Indicates cohesive failure

The above descriptions and examples are provided to aid in a complete, non-limiting understanding of the invention. Since many variations of the invention can be made without departing from the spirit and scope of the invention, the breadth of the invention resides in the claims hereinafter appended.

We claim:

1. A dry-bonded film laminate comprising a pair of flexible film substrates bonded with a curable adhesive, prepared by blending two parts at the time of use, the first part comprising a polyurethane polymer dispersed in an aqueous vehicle, the polymer having a plurality of carboxylic or sulfonic acid groups thereon which are neutralized with a tertiary amine, said neutralized carboxylate or sulfonic acid groups being derived from a polyol having at least one carboxylic or sulfonic acid group thereon, said polyol having been incorporated into said polyurethane polymer by reaction of the polyol with a polyisocyanate, and the second part being a crosslinker for the polyurethane polymer of the first part and comprising a compound having a plurality of carbodiimide groups or a compound having a plurality of aziridine groups, the laminate prepared by applying to a first flexible film substrate an aqueous dispersion of said two-parts; drying the applied adhesive; and then applying a second flexible film substrate to the dried adhesive.

2. A laminate as in claim 1 wherein said aziridine or carbodiimide compound is present on a polymer solids basis in the adhesive at a level of 1–20% by weight for an aziridine compound or 0.5–20% by weight for a carbodiimide compound.

3. A laminate as in claim 1 wherein the crosslinker comprises a compound having a plurality of aziridine groups which is present in the adhesive at a level of 1–20% by weight on a polymer solids basis and the crosslinker further comprises 0.1–10% by weight of adhesive polymer solids of a compound having a plurality of epoxy groups thereon.

4. A laminate as in claim 1 wherein at least one of said flexible film substrates comprises a non-polar thermoplastic material.

5. A laminate as in claim 1 wherein at least one of said flexible film substrates is selected from the group consisting of polyolefins, polyesters and polyamides.

6. A laminate as in claim 1 wherein said crosslinker comprises a compound having a plurality of aziridine groups thereon.

7. A laminate as in claim 1 wherein said crosslinker comprises a compound having plural carbodiimide groups thereon.

8. A laminate as in claim 1 wherein said adhesive is present therein at a level of between 0.5 and 4.0 lbs per 3000 ft$^2$.

9. A laminate as in claim 1 wherein at least one of said flexible film substrates is a metal foil or metalized polyester.

10. A laminate as in claim 9 wherein the second of said flexible film substrates is selected from the group consisting of polyolefins, polyesters and polyamides.

11. A laminate as in claim 1 characterized by a 180° peel strength of at least 500 grams after immersion in boiling water for 1 hour when tested at a rate of 12 inches/minute on 1 inch test strips.

12. A laminate as in claim 1 wherein one of the flexible film substrates is polyethylene terephthalate and the other is a polyolefin.

13. A laminate as in claim 1 wherein the first part of the adhesive is free of organic solvent.

14. A dry-bonded film laminate comprising a pair of flexible film substrates bonded with a curable adhesive, prepared by blending two parts at the time of use, the first part comprising a polyurethane polymer dispersed in an aqueous vehicle, the polyurethane polymer comprising a reaction product of a compound having a plurality of isocyanate groups thereon and a polyol component comprising a compound having a plurality of carboxylic or sulfonic acid groups thereon, said carboxylic or sulfonic groups having been neutralized with a tertiary amine, and the second part being a crosslinker for the polyurethane polymer of the first part and comprising a compound having a plurality of carbodiimide groups or a compound having a plurality of aziridine groups, the laminate prepared by applying to a first flexible film substrate an aqueous dispersion of said two-parts; drying the applied adhesive; and then applying a second flexible film substrate to the dried adhesive.

15. A laminate as in claim 14 wherein, after said reaction between said compound having a plurality of isocyanate groups thereon and polyol component, a polyurethane prepolymer had been obtained which has a residual level of isocyanate groups thereon, said prepolymer having been dispersed in an aqueous vehicle after neutralization of said acid groups with said tertiary amine, and said polyurethane polymer dispersed in said aqueous vehicle had been obtained by chain extension reaction of said prepolymer with a compound having two or more amine groups per molecule.

16. A laminate as in claim 14 wherein the crosslinker comprises a compound having a plurality of aziridine groups which is present in the adhesive at a level of 1–20% by weight on a polymer solids basis and the crosslinker further comprises 0.1–10% by weight of adhesive polymer solids of a compound having a plurality of epoxy groups thereon.

17. A laminate as in claim 14 wherein at least one of said flexible film substrates comprises a non-polar thermoplastic material.

18. A laminate as in claim 14 wherein said crosslinker comprises a compound having a plurality of aziridine groups thereon.

19. A laminate as in claim 14 wherein said crosslinker comprises a compound having plural carbodiimide groups thereon.

20. A laminate as in claim 14 wherein at least one of said flexible film substrates is a metal foil or metalized polyester.

21. A laminate as in claim 14 wherein the first part of the adhesive is free of organic solvent.

* * * * *

UNITED STATES PATENT AND TRADEMARK OFFICE
CERTIFICATE OF CORRECTION

PATENT NO. : 5,532,058
DATED : July 2, 1996
INVENTOR(S) : THOMAS ROLANDO ET AL It is certified that error appears in the above-identified patent and that said Letters Patent is hereby corrected as shown below:

Col. 9, line 4, delete "aziridinepropanoicacid" and insert therefor -- aziridinepropanoic acid --;

Col. 8, lines 64-65, delete "aziridinepropanoicacid" and insert therefor -- aziridinepropanoic acid --.

Signed and Sealed this

Twenty-fourth Day of September, 1996

Attest:

BRUCE LEHMAN

Attesting Officer

Commissioner of Patents and Trademarks